(No Model.) 3 Sheets—Sheet 1.
A. THURSTIN & F. JACOBY.
CORN PLANTER.
No. 315,857. Patented Apr. 14, 1885.
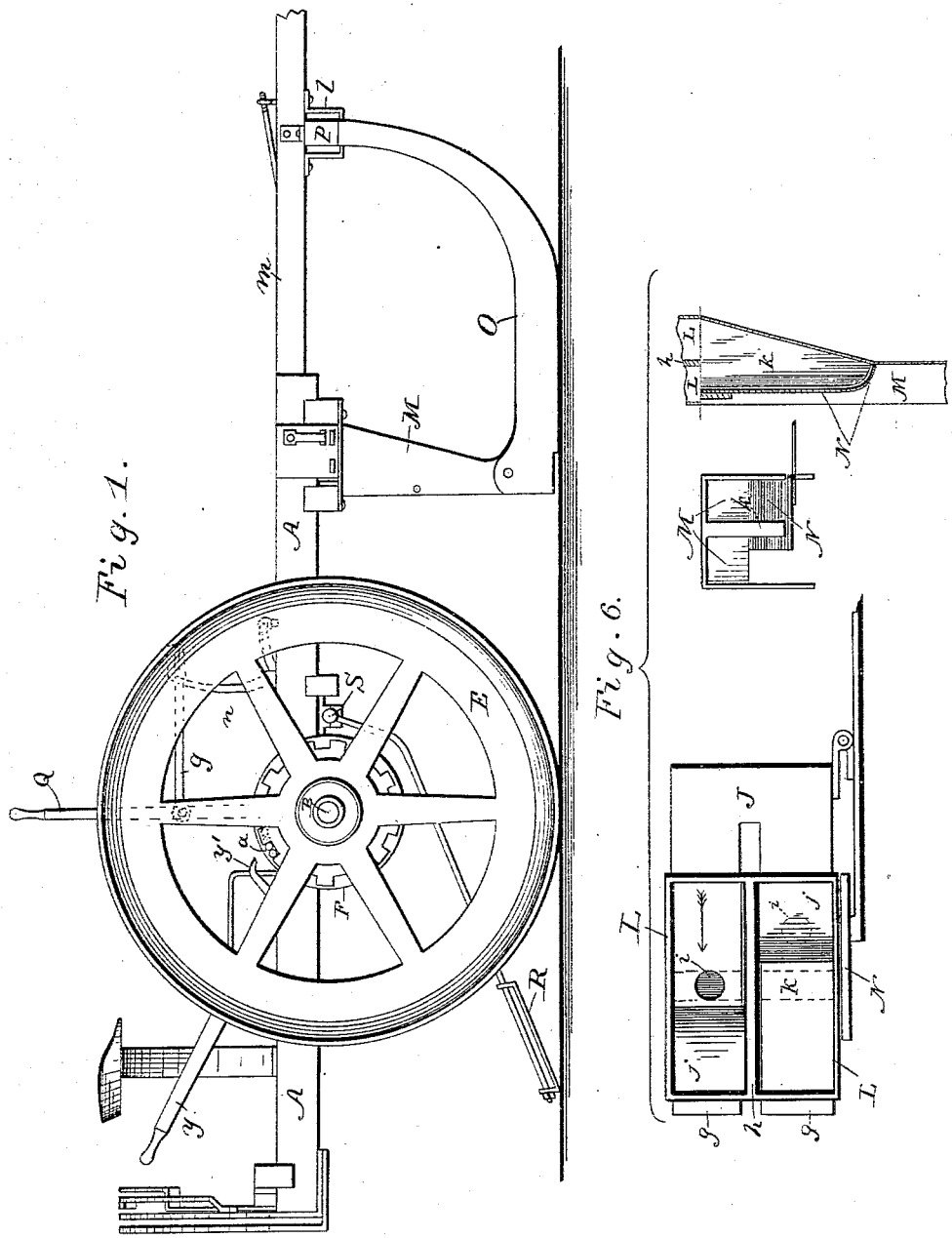
WITNESSES:
Thos. Houghton.
W. R. Stevens.
INVENTORS:
A. Thurstin
F. Jacoby
BY Munn & Co
ATTORNEYS.

(No Model.) 3 Sheets—Sheet 2.
A. THURSTIN & F. JACOBY.
CORN PLANTER.
No. 315,857. Patented Apr. 14, 1885.
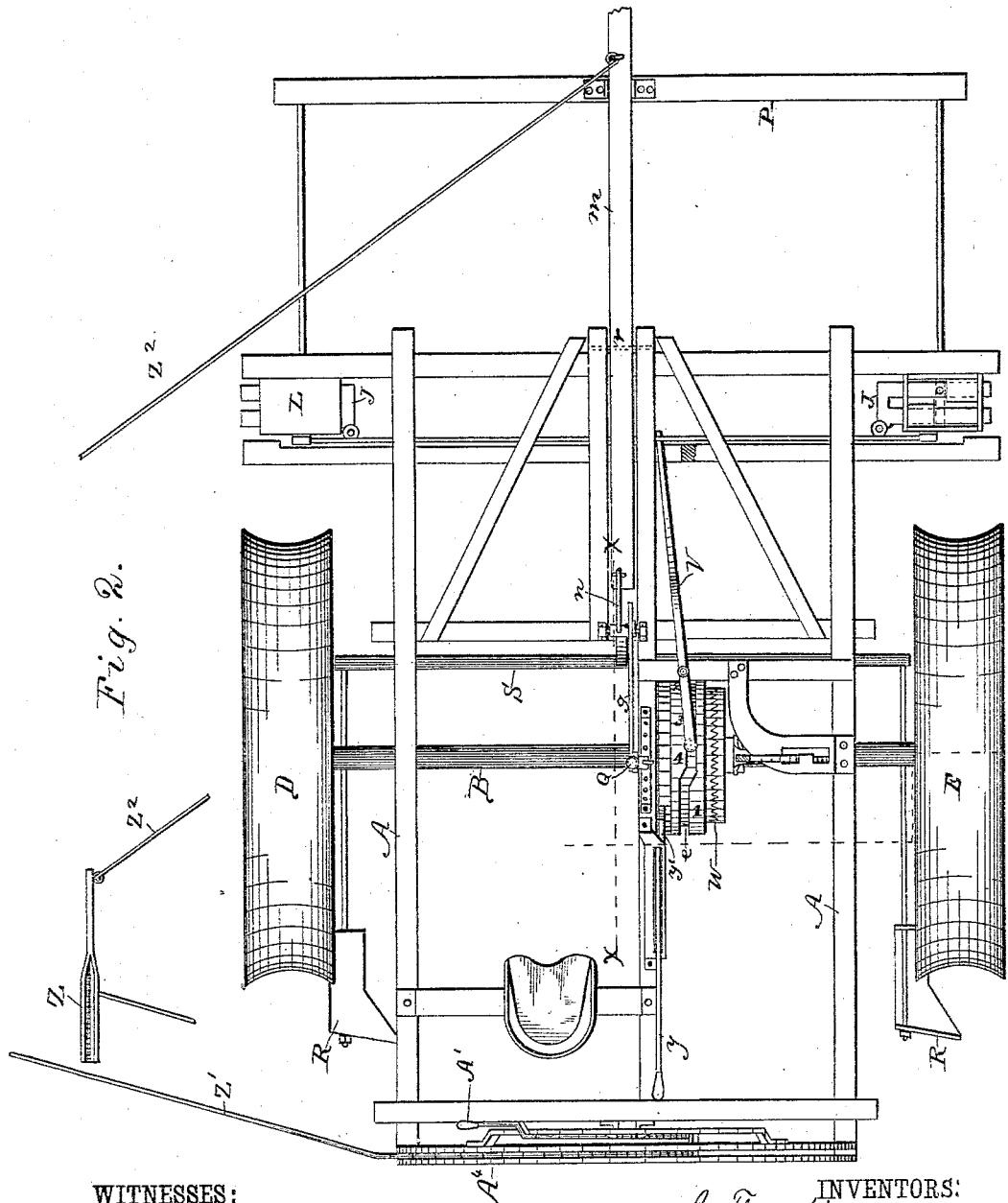
WITNESSES:
Thos. Houghton.
W. R. Stevens.
INVENTORS:
A. Thurstin
F. Jacoby
BY Munn & Co
ATTORNEYS.

(No Model.) 3 Sheets—Sheet 3.
A. THURSTIN & F. JACOBY.
CORN PLANTER.
No. 315,857. Patented Apr. 14, 1885.
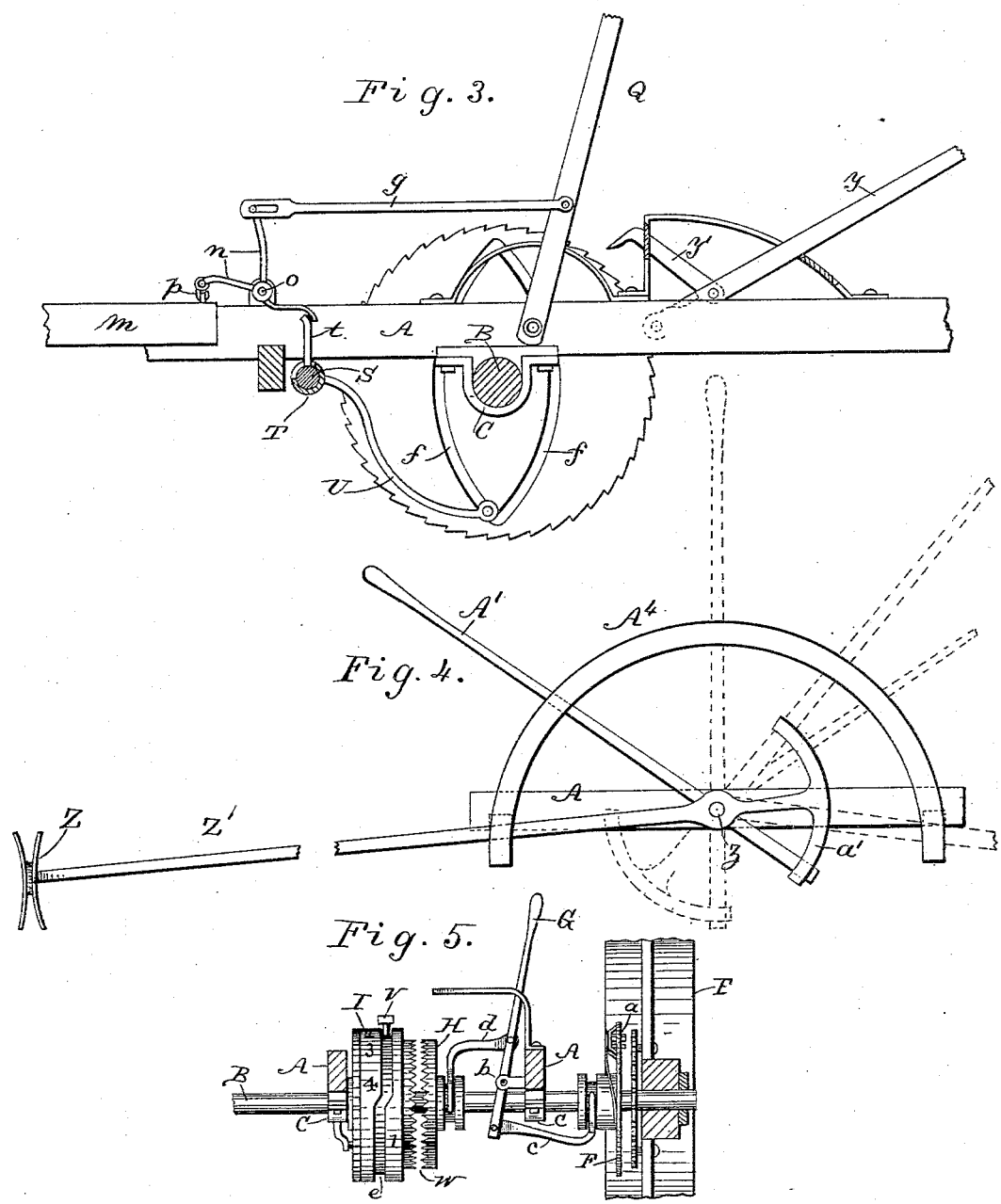
WITNESSES:
Thos. Houghton.
W. R. Stevens
INVENTORS:
A. Thurstin
F. Jacoby
BY Munn & Co.
ATTORNEYS.

UNITED STATES PATENT OFFICE.

ALBERT THURSTIN AND FREDERICK JACOBY, OF O'FALLON, MISSOURI.

CORN-PLANTER.

SPECIFICATION forming part of Letters Patent No. 315,857, dated April 14, 1885.

Application filed August 28, 1884. (No model.)

*To all whom it may concern:*

Be it known that we, ALBERT THURSTIN and FREDERICK JACOBY, citizens of the United States, residing at O'Fallon, in the county of St. Charles and State of Missouri, have invented certain new and useful Improvements in Corn-Planters, of which the following is a description.

The object of this invention is to plant corn in check-rows; and it consists in the construction and combination of parts forming a corn-planter, hereinafter described and claimed, reference being had to the accompanying drawings, in which—

Figure 1 is a side elevation of our corn-planter. Fig. 2 is a plan view of the same. Fig. 3 is a vertical section on the line $x\ x$ of Fig. 2. Fig. 4 is a rear view of the laying-off device, partly broken out to shorten it into the limit of the drawing. Fig. 5 is a rear view of the clutches, and Fig. 6 is a detail.

A represents the frame of the machine, mounted on an axle, B, by means of boxes C, in which the axle turns.

D is the main drive-wheel, secured to the axle.

E is an auxiliary drive-wheel mounted to revolve on the axle B, with which it may be connected, at the will of the operator, by means of a clutch consisting of the disk F, which is engaged with axle by means of a spline, permitting the disk to move longitudinally on the axle, but forcing it to turn with the axle.

$a$ represents a series of pins fitted to slide through the disk to engage any tooth in the circle of teeth fixed on the hub of wheel E. Each of these pins is provided with a spring acting to press it constantly through the disk.

The object in having a number of pins to engage the teeth is to enable the wheel to be clutched at any point of its revolution, and the object of the clutch is to set the wheels at liberty to revolve either one faster than the other in turning corners.

To slide the disk on the axle, a common shipper device is used, consisting of the lever G, pivoted to the frame at $b$, and connected to the disk by a bent and forked rod, $c$, entering a groove in the hub of the disk. The lever G is double in its action, it being connected with the movable member H of another clutch by means of the crooked and forked rod $d$. The member H is splined to the axle to slide lengthwise thereon and to revolve therewith. It is provided on one face with a circle of equally-spaced fine teeth adapted to engage similar teeth on the cam I at any point in a revolution. The cam I is mounted to revolve on the axle, and is provided with two grooves, the groove $e$ in its periphery being adapted to operate the seed-dropper gate J by means of the lever V, and the groove $f$ in its face being adapted to operate the hill-markers R. The gate J is made double beneath each seed-box L, it being formed with two connected slides, $g$, one at each side of the central portion, $h$, of the seed-box floor, for the purpose of thoroughly agitating the seed to keep it loose and ready to fall quickly into the openings $i$, which measure the seed to be dropped. $j\ j$ are stationary shields under which the gates slide their openings $i$ to drop their seed into the broad mouths of the spouts M, the shields preventing the seed from entering when the bottoms of the latter are open. $k$ is a middle partition dividing the spout into two parts, and serving as a floor to each opening $i$ when the same is cut from under the shield to be filled with seed.

By placing the two gates in separate paths, one shielded at one end of its path and the other at the other end, the seed is given a sidewise alternating movement in the box L, that keeps it from clogging.

N is the lower gate adapted to alternately stop the passages each side of the partition $k$, to catch and hold the corn near the ground, that it may drop accurately at the desired points. This gate is attached rigidly to the sliding gate J, and moves directly therewith, having no other support. This construction is simple and effective.

O represents the runners which clear the paths for the seed to drop in. The rear ends of the runners are pivoted to the lower ends of the spouts M, and their forward ends are secured to a cross-bar, P, which is supported to slide in an elongated clip, $l$, secured to the team-pole $m$.

$n$ is a three-armed bell-crank lever pivoted to the frame at $o$, and connected with the rear end of the team-pole by a link, $p$. It is also connected with the hand-lever Q by an open link, $q$. While the rear end of the pole and the runners supported thereby may be raised by the lever Q, the opening in the connecting-link q permits the pole to rise and fall enough to accommodate the movement of the team without affecting the runners. Suppose the forward end of the team pole to be supported at a given height, if the hand-lever Q be moved rearward, the rear end of the pole will be raised, and the runners will also be raised. The pole being pivoted at r, the raising of its rear end will cause the cross-bar P to slide forward, thus necessitating the elongation of the clip l referred to.

R represents the hill-markers, hung by arms upon a rock-shaft, S, which is journaled in the frame and provided with a short arm, t, projecting through a slot in a sleeve, T. This sleeve is free to turn upon the shaft S until the lower end of its slot engages the arm t and raises the markers, and it is provided with an arm, U, on which is mounted a roller to run permanently in the cam-groove f. As here shown, the cam-groove f is shaped to raise the arm t twice to each revolution of the wheel, and the cam-groove e is shaped to operate the dropper twice in the same time, so that one-half the circumference of the drive-wheel measures the distance between the hills of corn dropped. The cam-grooves e and f are so timed relative to each other as to actuate the markers to mark a hill previously dropped at the same time that a new hill is dropped, so that the distance between the spout and the markers must be the distance between hills. The hill-markers R are made each to project to one side of its supporting-arm, and they are made reversible, so as to project either to the right or left, the arms being square and fitted into square holes in the markers. By this means the markers may be set to mark the ground in the wheel-track if the earth be such that the wheel will leave a smooth track, or they may be set to mark on the earth just within the wheel-tracks. At the end of a row the operator disengages both clutches F and H by a single movement of the lever G, which stops the action of the droppers and markers, and sets the drive-wheels free to run independently of each other to turn about.

To start the machine to dropping in hills registering with those previously planted, we have devised independent means of setting the cam-wheel as follows:

W represents ratchet-teeth on the cam-wheel, Y a hand-lever, and y' a pawl pivoted to the lever, to engage the ratchet-teeth when the lever is forward, but provided with a shouldered joint, which disengages the pawl from the teeth when the lever is far back. By this means the cam may be set forward when not clutched to the axle, and the pawl y may be held out of engagement when not in use. Each half of the circumference of the cam is divided into four equal parts, marked with large figures from 1 to 4. The figure 1 is located one-eighth the circumference of the cam-wheel behind the dropping and marking point on each half of the wheel, and the other numerals follow in their order.

Let us suppose that the machine on turning at the end is stopped. The hose reaches the first hill by a distance equal to one-half a space between hills. Then the operator may set the cam by turning the figure 2 upward, so that on throwing in the clutch and going ahead the machine will drop a hill opposite the first hill in the rows, and will then continue to drop in checks with each row.

Z represents the laying-off plow or row-marker, which is secured to a long arm, Z', pivoted at z in the center of the width of the machine. It is also secured by a brace-rod, Z'', which is pivoted in an eyebolt on top of the team-pole. Thus hung the marker may be swung over to mark rows either side of the machine, so that it may mark the line of a subsequent row while going either way as a guide to the driver.

A' is a hand-lever pivoted concentrically with the arm Z', which it engages by means of lugs at the ends of the T-head a'. By this means the marker Z may be raised from the ground, and it may be held raised by engaging the lever A' in a notch in the metallic arc A''. When turning the marker Z completely over, the space between the two lugs on the T-head permits it to fall ahead of the lever to relieve the operator of holding it. This row-marker, the hill-markers, and the driver's seat are in a line at right angles to the path of the machine, so that the row-marker may be used to align the rows across the path of the machine.

What we claim as our invention, and desire to secure by Letters Patent, is—

1. The combination, with a wheel, D, and an axle, B, journaled to revolve in a corn-planter frame, of a drive-wheel, E, mounted to revolve on the axle, and provided with a circle of teeth on its hub, a disk, F, mounted on the axle B by means of a spline permitting longitudinal motion thereof, and a series of pins, a, provided with springs and fitted to project through the disk to engage the teeth in wheel E, as shown and described.

2. The combination, with a planter mounted on wheels D E, and provided with a pole, m, of the hill-markers R and the row-marker Z, located in a line with the driver's seat and with each other, the brace Z'', secured at one end to the row-marker, and pivoted at the other end to the pole m, passing in front of the wheels, and the brace Z', secured at one end to the row-marker, and pivoted near the other end to the frame, in line of the pole, to the rear of the seat, and passing to the rear of the wheels, substantially as shown and described.

3. The combination, with the seed-box L, provided with the shields j j, each less than one-half the length of the box, and in diagonally-opposite corners thereof the central longitudinal line of floor h, and the partition k, located transversely beneath the center of the box, of the single gate J, partly divided, forming two slides, g g, having seed-delivery openings i, adapted to register alternately with the partition k and the shields j, substantially as shown and described.

4. The combination, with the seed-box L, the spout M, having the fixed partition k, and the sliding gate J, of the lower gate, N, rigidly secured to and supported by the gate J, as shown and described.

5. The combination, with the hill-markers R, the rock-shaft S, provided with an arm, t, of the sleeve T, loosely mounted on shaft S, and provided with a slot engaging the arm t, the arm U on sleeve T, carrying a roller, and the cam I, having in it the groove f, to receive the said roller, as shown and described.

6. The combination, with the hill-markers R, the rock-shaft S, provided with the arm t, the sleeve T, loosely fitted on the rock-shaft, and provided with a slot engaging the arm t, the arm U on sleeve T, and the cam I, provided with the groove f, engaging the arm U, of the bell-crank lever n, the hand-lever Q, and the open link p, as shown and described.

7. The combination, with the slide-gate of a corn-dropper, an operating-lever therefor, and a hill-marker hung to the rear of the dropper, of a cam having one groove to actuate the slide gate lever, and another groove to actuate the marker, the two grooves being in a relation to each other corresponding to the space between the corn-dropper and the hill-marker, as described, whereby the advance of the machine will cause the marker to mark the hills previously planted by the dropper.

8. The combination, with a hill-marker provided with a square shank-hole, and having its foot or marking end extending to one side of the hole, of a supporting-arm having a square shank reversibly securable in the said square hole, substantially as shown and described.

ALBERT THURSTIN.
FREDERICK JACOBY.

Witnesses:
MENALCAS GRAY,
SILVANUS TERRY.